United States Patent
Huang et al.

(10) Patent No.: US 7,019,952 B2
(45) Date of Patent: Mar. 28, 2006

(54) RECEPTACLE DEVICE HAVING CIRCUIT INTERRUPTING AND REVERSE WIRING PROTECTION

(75) Inventors: Huadao Huang, Yueqing (CN); Chengli Li, Shanghai (CN)

(73) Assignee: Shanghai Meihao Electric Inc., Shanghai (CN)

( * ) Notice: Subject to any disclaimer, the term of this patent is extended or adjusted under 35 U.S.C. 154(b) by 434 days.

(21) Appl. No.: 10/368,429

(22) Filed: Feb. 20, 2003

(65) Prior Publication Data
US 2004/0027740 A1 Feb. 12, 2004

(30) Foreign Application Priority Data
Aug. 7, 2002 (CN) .............................. 02243497 U

(51) Int. Cl.
*H02H 3/16* (2006.01)

(52) U.S. Cl. .......................................... 361/42; 361/44
(58) Field of Classification Search ................ 361/42, 361/43, 44, 45, 114, 115, 46–50; 324/426, 324/500, 523
See application file for complete search history.

(56) References Cited

U.S. PATENT DOCUMENTS

| | | | |
|---|---|---|---|
| 4,595,894 A | 6/1986 | Doyle et al. .................. 335/18 |
| 5,963,408 A | 10/1999 | Neiger et al. ................. 361/45 |
| 6,040,967 A | 3/2000 | DiSalvo ........................ 361/42 |
| 6,246,558 B1 | 6/2001 | DiSalvo et al. ............... 361/42 |
| 6,252,407 B1 | 6/2001 | Gershen ...................... 324/509 |
| 6,262,871 B1 * | 7/2001 | Nemir et al. ................. 361/42 |
| 6,282,070 B1 | 8/2001 | Ziegler et al. ............... 361/42 |
| 6,381,112 B1 | 4/2002 | DiSalvo ........................ 361/42 |
| 6,580,344 B1 * | 6/2003 | Li ................................ 335/18 |
| 6,671,145 B1 * | 12/2003 | Germain et al. ............. 361/45 |

* cited by examiner

*Primary Examiner*—Brian Sircus
*Assistant Examiner*—Danny Nguyen
(74) *Attorney, Agent, or Firm*—Fei-Fei Chao; Bingham McCutchen LLP

(57) ABSTRACT

A circuit interrupting system has an upper cover, an intermediate support, and a base. A mounting strap is installed between the upper cover and the intermediate support, and a electric circuit board installed between the intermediate support and the base. The upper cover includes an electric output plug, a test button, and a reset button. The mounting strap includes a ground point that is connected to a ground receptacle of the electric output plug; the intermediate support on both sides a pair of output conductors. The electric circuit board comprises a differential transformer, a solenoid coil having a plunger inside, a reset button bias member, and a flexible switch; both sides of the base respectively comprise in parallel a pair of electric input connection screws and a pair of electric output point. The ground fault circuit interrupting system is installed within an output box on the wall of an ordinary household which prevents hazard caused to human and household electronics by errors in the installation of the connection lines.

17 Claims, 11 Drawing Sheets

RECEPTACLE DEVICE HAVING CIRCUIT INTERRUPTING AND REVERSE WIRING PROTECTION

RELATED APPLICATION

This application claims the priority of Chinese Patent Application No. 02243497.6, filed on Aug. 7, 2002, which is incorporated herein by reference.

FIELD OF THE INVENTION

The present invention relates to a receptacle device, particularly a ground fault circuit interrupter (GFCI) or an arc fault circuit interrupter (AFCI), which provides protection to humans and property against faults in electrical equipment and in electrical supply and distribution systems so that upon detection of a fault condition, the receptacle device interrupts the electric supply circuit. The receptacle device is also capable of protecting against faults caused by reverse wiring.

BACKGROUND OF THE INVENTION

Safety associated with the use of household appliances is a great concern for people. This is especially the case as more and more electronic devices are used in homes today. Accordingly, it is desired to provide the electric receptacles in the walls of ordinary households with safety features. However, most receptacles in homes are ordinary receptacles without the capability to protect against leakage of electric current. When these ordinary receptacles are used, leakage of electric current or a shock hazard may occur.

Receptacles with safety features that guard against the leakage of electric current, such as a ground fault circuit interrupter (GFCI) and an arc fault circuit interrupter (AFCI), have been in existence since the early 1970s. However, until recently, most of these receptacles did not possess a reverse wiring protection feature. Reverse wiring means that load wires are mistakenly connected to a line side of the receptacle and line wires are mistakenly connected to a load side of the receptacle. When this occurs, although the input end and the output end of the receptacle are still electrically connected, the receptacle no long provides fault-protection. Without a reverse wiring protection feature, a consumer, after mistakenly reversing the line wire and load wire connections to the receptacle may be misled to believe that the receptacle is still functioning properly and will detect a fault condition. However, the consumer does not know that the fault-protection feature is not operational. The continued use of a reverse wired receptacle might cause injury to users and damage to the household electronic appliances, as well as damage to real property.

Accordingly, there is a need for a circuit-interrupting device that provides reverse wiring protection and that may also protect against fault conditions, such as ground faults and arc faults, among others.

SUMMARY OF THE INVENTION

To solve the above problems, embodiments of the present invention provide a circuit interrupting device, such as a GFCI or an AFCI. This type of circuit interrupting device is suitable for installation in an output box in a wall of an ordinary household, such as a typical wall receptacle. When the input and output wires are mistakenly connected in a reverse manner during installation of the receptacle, the receptacle prevents an electric connection between the input end and output end of the receptacle. Thus, when the input wire is mistakenly connected to the output end of the receptacle and the output wire is mistakenly connected to the input end of the receptacle, there is no electric voltage output from the receptacle. Only when the wires of the receptacle are properly connected can the receptacle be reset and the output end provide a voltage output.

Embodiments of the present invention provide a receptacle mainly comprising an upper cover, an intermediate support, and a base. A mounting strap is installed between the upper cover and the intermediate support, and an electric circuit board is installed between the intermediate support and the base.

The upper cover comprises an electric output plug, a test button, and a reset button.

The mounting strap comprises a ground point that is connected to a ground receptacle of the electric output plug through an opening in the upper cover.

The intermediate support comprises a pair of output conductors made of conductive materials. The two output conductors each have pieces corresponding to the hot receptacle and the white receptacle on the electric output plug on the upper cover. The output conductors also comprise, respectively, electric contacts corresponding to electric contacts on a flexible electric input piece on the electric circuit board. A test button switch piece is located between one of the output conductors and the test button.

The electric circuit board comprises a pair of flexible input components having four flexible input fingers, a differential transformer for testing for leakage of electric current, a solenoid coil having a plunger therein, a reset button bias member, and a flexible switch.

The flexible input components are located on both sides of a central opening in the reset button bias member and passes through the differential transformer to connect to the electric input point. The flexible input fingers include two pairs of electric contacts, one pair of the electric contacts correspond to a pair of the electric contacts on the output conductor in the intermediate support, while the other pair corresponds to a pair of electric contacts on the output conductors.

The base encloses the electric circuit board and the intermediate support. Both sides of the base comprise, respectively, a pair of electric input connection screws and a pair of electric output connection screws connected in parallel. The electric input connection screws connect to the flexible input components in the electric circuit board, and the electric output connection screws connect to the electric output metal pieces in the base.

The reset button bias member is comprised of a cylinder located underneath the reset button. A central opening is provided in the reset button bias member, a movable L-shaped latch is arranged at the bottom of the reset button bias member. The latch has an opening. A directional lock is located inside the reset button bias member and vertically passes through the central opening. The directional lock has a bottom surface, and a locking groove is located above and close to the bottom surface of the directional lock. A spring is provided on the directional lock and biases the reset button. Another spring is also located between one side of the reset button bias member and the latch component.

The flexible switch is located between the reset button bias member and the electric circuit board. The flexible switch is made of flexible conductive material. A first end of the flexible switch is attached to the electric circuit board and is connected to a resistor. The resistor is coupled to an anode of a rectifier circuit on the electric circuit board. A second end of the flexible switch has a protruding pinpoint contact corresponding to a contact on the electric circuit board, which is in turn connected to a gate trigger of a silicon-controlled rectifier (SCR) that is connected to the solenoid coil on the electric circuit board.

A test resistor is located underneath the test button with one end series connected to a white line of the electric input wire.

In another exemplary embodiment, a reset apparatus for a circuit interrupting device including a line side connection capable of being electrically connected to a source of electricity; a load side connection capable of being electrically connected to a load side conductor, is provided. The reset apparatus comprises a reset button having a depressed and a relaxed position. A resilient element biases the reset button into the relaxed position. A directional lock is coupled to the reset button and has a bottom surface. A bias member is arranged under the reset button, the reset bias member defines a central aperture therein receiving the directional lock. The directional lock is moveable in a vertical direction in the aperture. A first pair of electric contacts is provided for making an electric connection between the line side connection and the load side connection. A latch extends into the bias member and through the aperture, the latch defines an opening therein and is movable through the aperture in a horizontal direction between an aligned position in which the opening is aligned with the bottom surface of the directional lock and a misaligned position in which the opening is misaligned with the bottom surface of the directional lock. The latch is adapted to engage the directional lock such that movement of the reset button to the relaxed state causes the bias member to close the first pair electric contacts.

In another exemplary embodiment the circuit interrupting device comprises a line side connection capable of being electrically connected to a source of electricity. A load side connection capable of being electrically connected to a load side conductor for providing electricity to a load side. A user load connection capable of conducting electricity to at least one load for providing an electrical connection to the source of electricity. A first conductive path provides an electrical connection between the line side connection and the user load connection. A second conductive path provides an electrical connection between the line side connection and the load side connection. A reset mechanism for establishing an electrical connection. First means for detecting a fault condition and second means, separate from the first means, for testing for a reverse wiring condition when the reset mechanism is actuated are also provided. Means interrupt at least one of the first conductive path or the second conductive path when a reverse wiring condition or a fault is detected.

According to another embodiment, the circuit interrupting device comprises a first conductor and a second conductor. A first pair of contacts is provided with each contact coupled to one of the first and second conductors. A second pair of contacts is moveable to a closed position via a reset button. A plunger is disposed in a solenoid. The plunger is moveable between a first position and second position when the solenoid is energized and de-energized, respectively. A current controller is coupled to the solenoid and to at least one of the first and second conductors via the second pair of contacts. The current controller prevents current flow through the solenoid to de-energize the solenoid when the first and second conductors are reverse wired and allows current flow to energize the solenoid when the first and second conductors are wired correctly. A fault detection circuit energizes the solenoid when a fault is detected. When the solenoid is energized via the current controller, the plunger initiates closing of the first pair of contacts to complete a circuit between the first and second conductors and when the solenoid is energized via the fault detection circuit the plunger initiates opening of the first pair of contacts to interrupt the circuit between the first and second conductors.

DETAILED DESCRIPTION OF INVENTION

Figure 1:
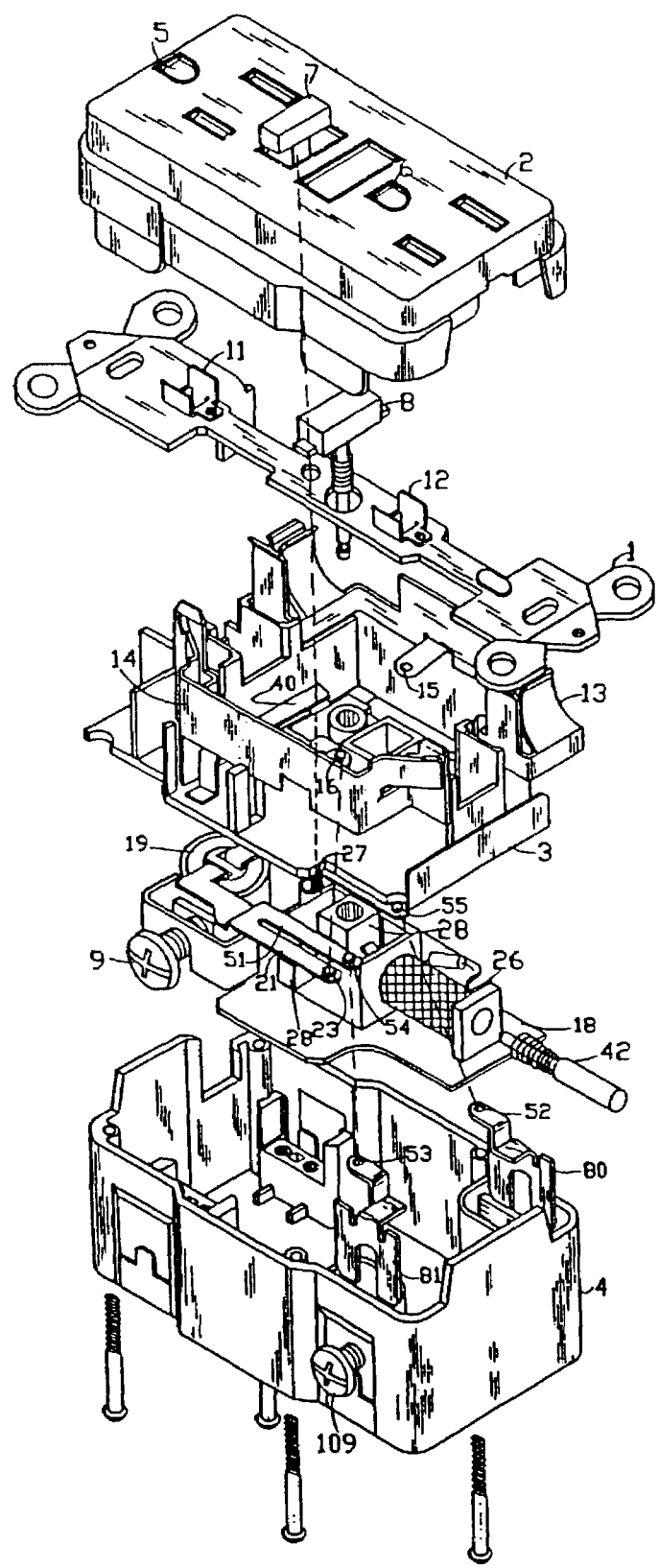
FIG. 1 is a three-dimensional exploded view of the circuit interrupting device of the present invention.
Figure 2:
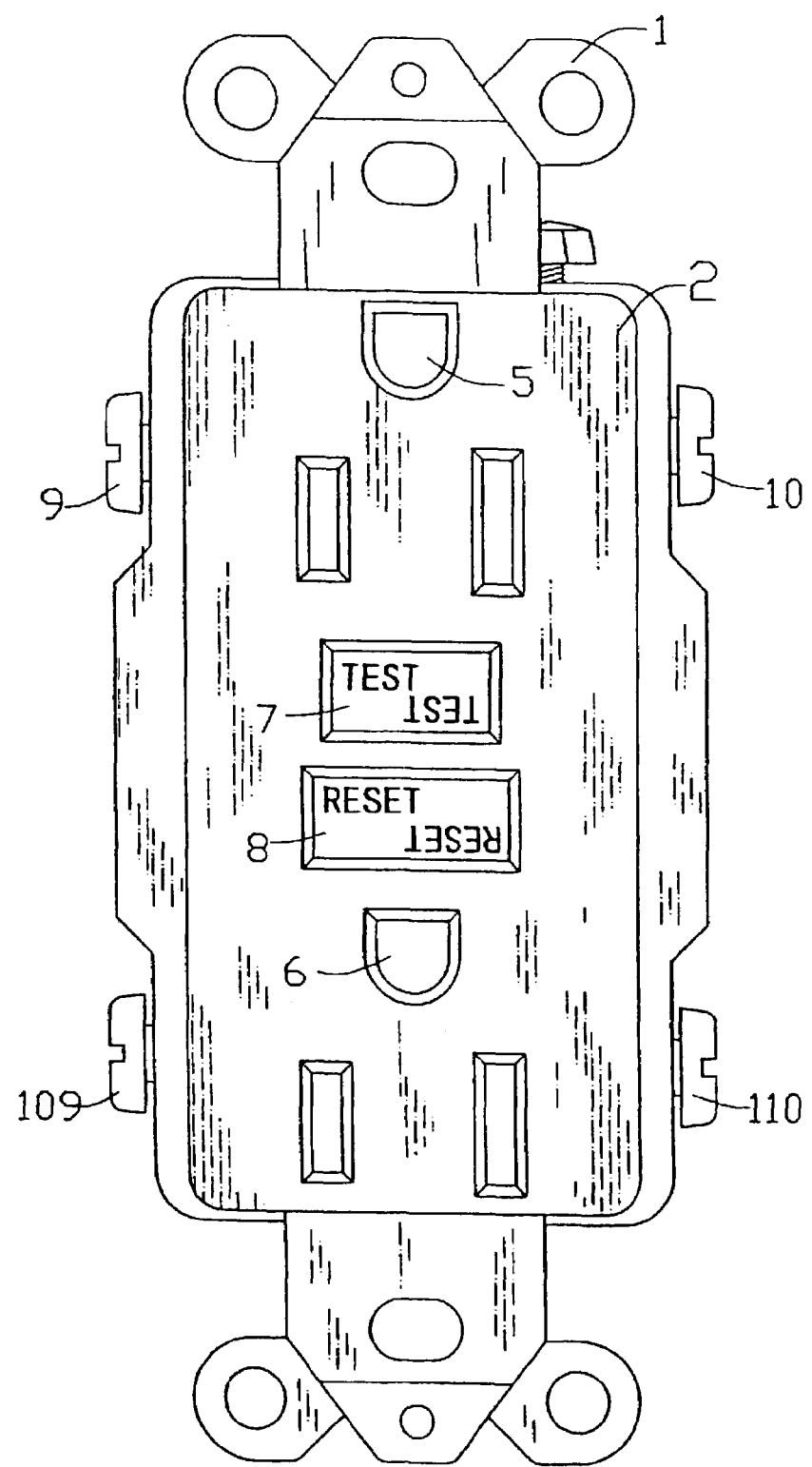
FIG. 2 is a perspective view of the circuit interrupting device of an embodiment of the present invention.

As shown in FIGS. 1–4, a circuit interrupting device, for example a GFCI, an AFCI, or other device, according to an exemplary embodiment of the present invention mainly comprises an upper cover 2, an intermediate support 3, and a base 4 assembled together. As shown in FIG. 2, on the upper cover 2, there are two electric output plugs 5 and 6, a test button (TEST) 7, and a reset button (RESET) 8.

A mounting strap 1 is installed between the upper cover 2 and the intermediate support 3. The mounting strap 1 has ground points 11, 12 that are connected to ground receptacles of the electric output plugs 5, 6 through openings in the upper cover 2. An electric circuit board 18 is installed between the intermediate support 3 and the base 4.

Figure 3:
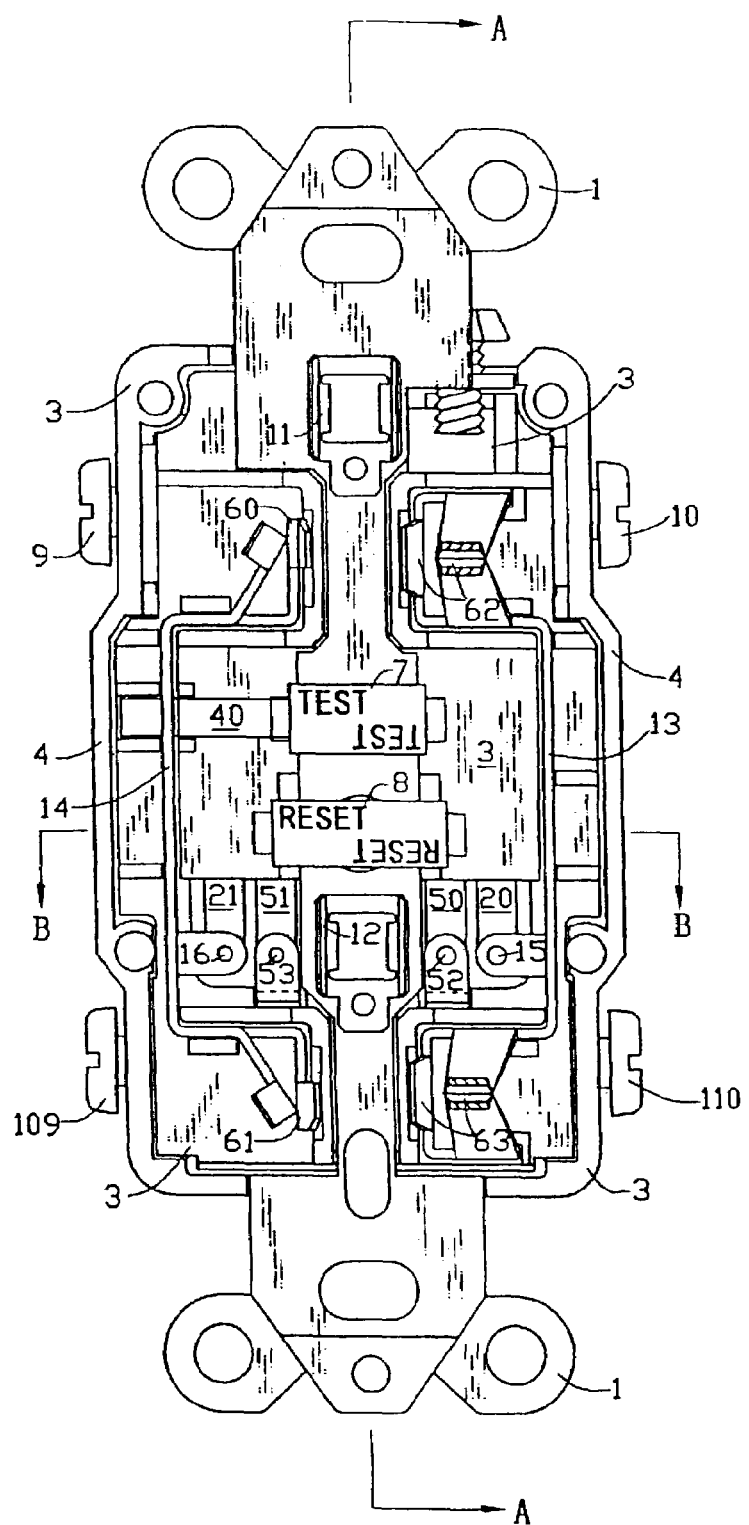
FIG. 3 is a perspective view of the circuit interrupting device of an embodiment of the present invention without the upper cover.

As shown in FIG. 3, the intermediate support 3 includes a pair of output conductors 13, 14 that are made from conductive materials. The output conductors 13, 14 are disposed on either side of the support 3. The two output conductors 13 and 14 have conductive members 60, 61, 62, and 63 corresponding to the hot receptacles and white receptacles of the electric output plugs 5, 6 in the upper cover 2. Additionally, the output conductors 13, 14 also comprise, respectively, electric contacts 15 and 16. A test button switch piece 40 is located between one of the output conductors 13, 14 and the test button 7.

As shown in FIG. 1, the base 4 is used as a housing to enclose the intermediate support 3 and the electric circuit board 18. Both sides of the base 4 comprise, respectively, a pair of electric input connection screws 9 (HOT) and 10 (WHITE) and a pair of electric output connection screws 109 (HOT) and 110 (WHITE), coupled in parallel. Inside the base 4, there are a pair of electric output leads 81 and 80 connected to the electric output connection screws 109 (HOT) and 110 (WHITE) respectively. The electric output leads 80 and 81 have two electric contacts 52 and 53, respectively.

Figure 4:
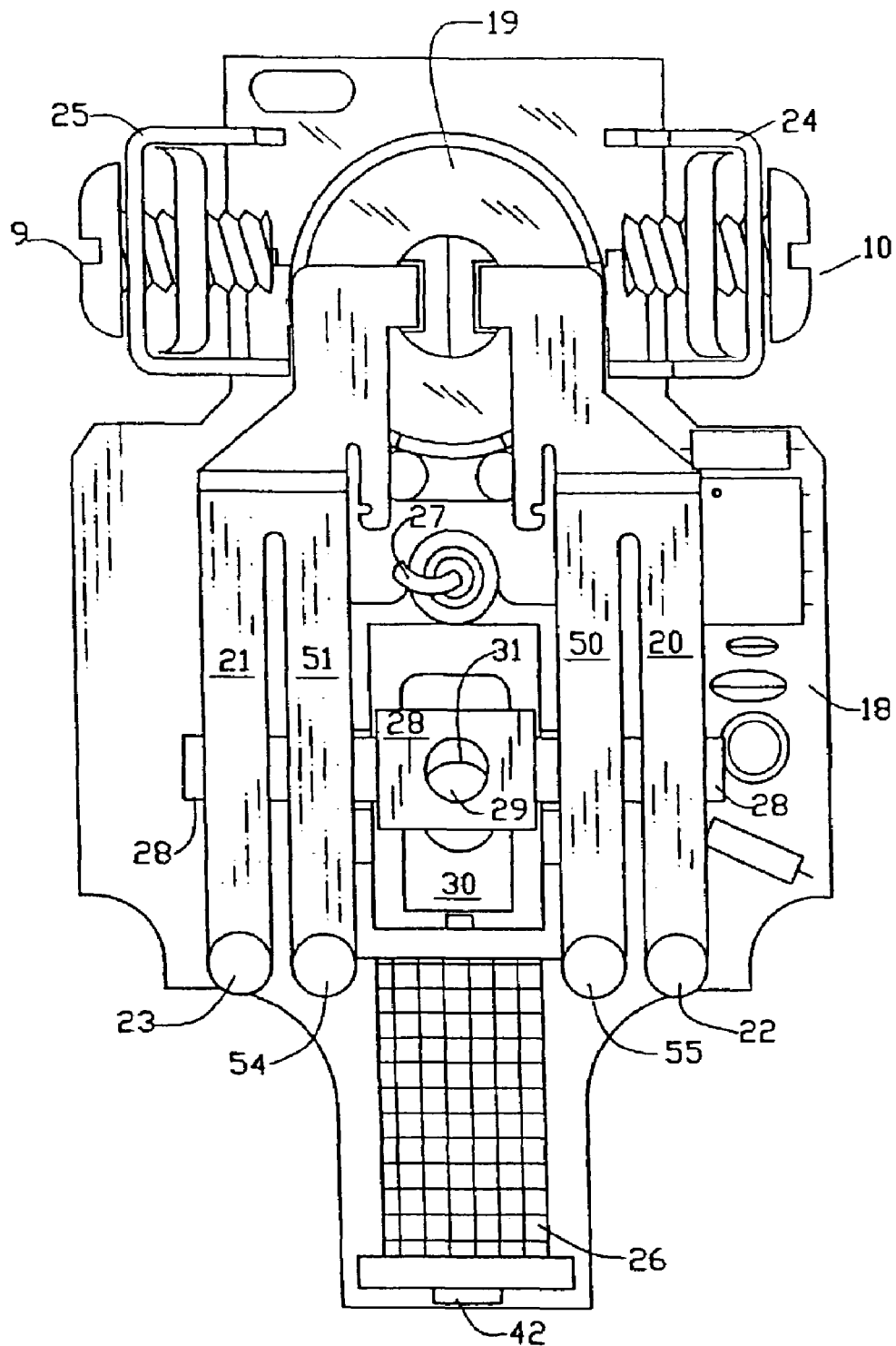
FIG. 4 is a view of the components on the electric circuit board placed inside the base of the circuit interrupting device of an embodiment of the present invention.

As shown in FIGS. 4 and 5A, inside the base 4, the electric circuit board 18 comprises a pair of electrically conducting flexible input components 95, 96 having four flexible input fingers 20, 21, 50, and 51, a differential transformer 19 for testing for leakage of electric current, a solenoid coil 26 having a plunger 42 therein, a reset button bias member 28, and a flexible switch 37.

The flexible input fingers 20, 21, 50 and 51 at one end of the flexible input components 95, 96 have electric contacts 22, 23, 55 and 54. The other ends of the flexible input components 95, 96 pass through the differential transformer 19 to connect via input leads 24 and 25 to the electric input connection screws 9 and 10. The electric contacts 22 and 23 on the flexible input fingers 20, 21 correspond to the electric contacts 15 and 16 on the output conductors 13, 14 in the intermediate support 3. The electric contacts 54 and 55 on the flexible input fingers 50, 51 correspond to the electric contacts 52 and 53 on the electric output leads 80 and 81 in the base 4.

Also included on the electric circuit board 18 is a solenoid coil 26, with a plunger 42 placed inside. A test resistor 27 is located underneath the test button 7 on the upper cover 2, with one end of the test resistor 27 connected to the input connection screw 10 (WHITE) (See FIG. 8).

Figure 5:
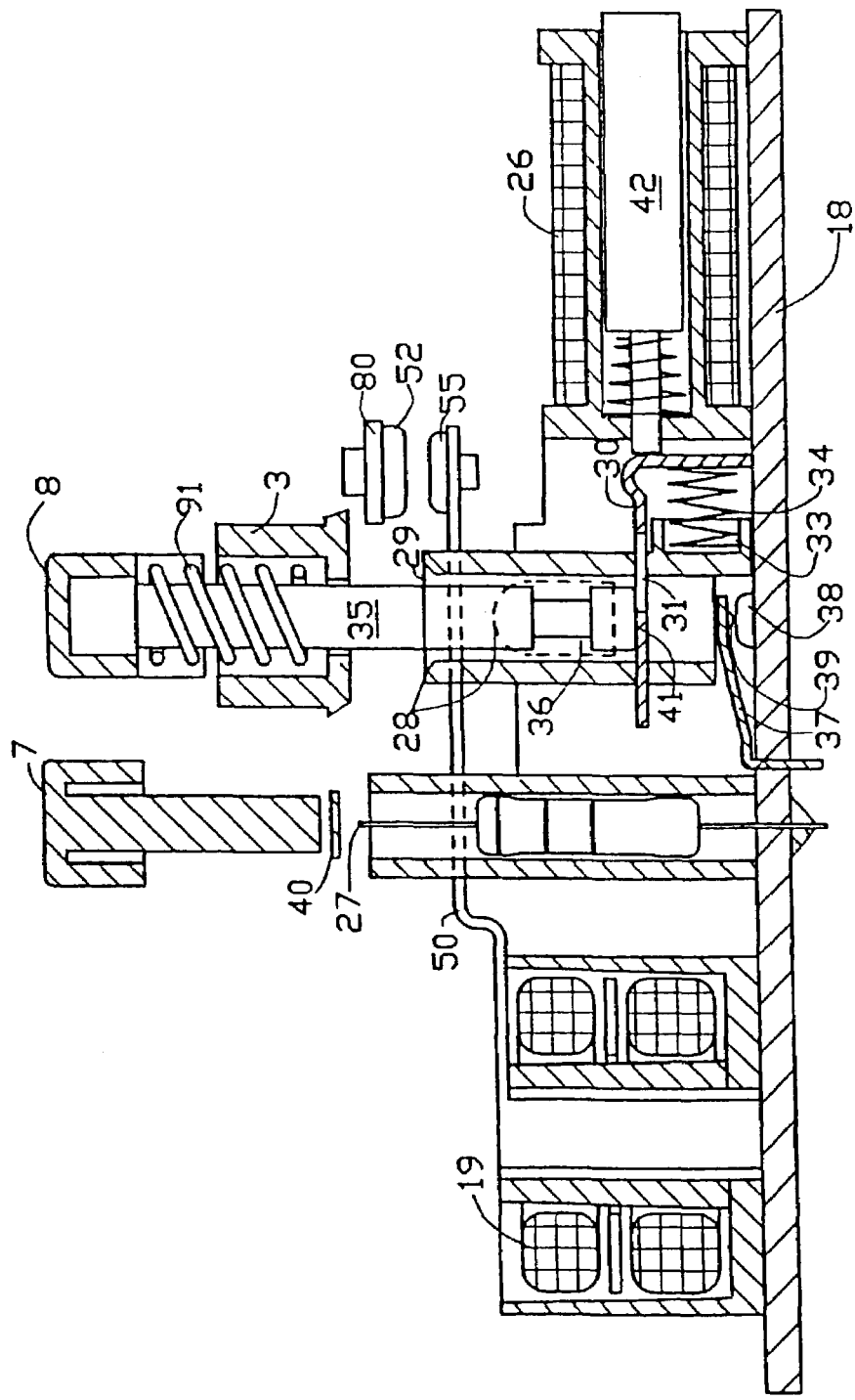
FIG. 5A is a sectional view of FIG. 3 following line A—A, schematically showing an interruption of the electric connection between the electric input end and the electric output end in the circuit interrupting device of an embodiment of the present invention.
FIG. 5B is a sectional view of FIG. 3 following line B—B, schematically showing an interruption of the electric connection between the electric input end and the electric output end in the circuit interrupting device of an embodiment of the present invention.
Figure 5B:
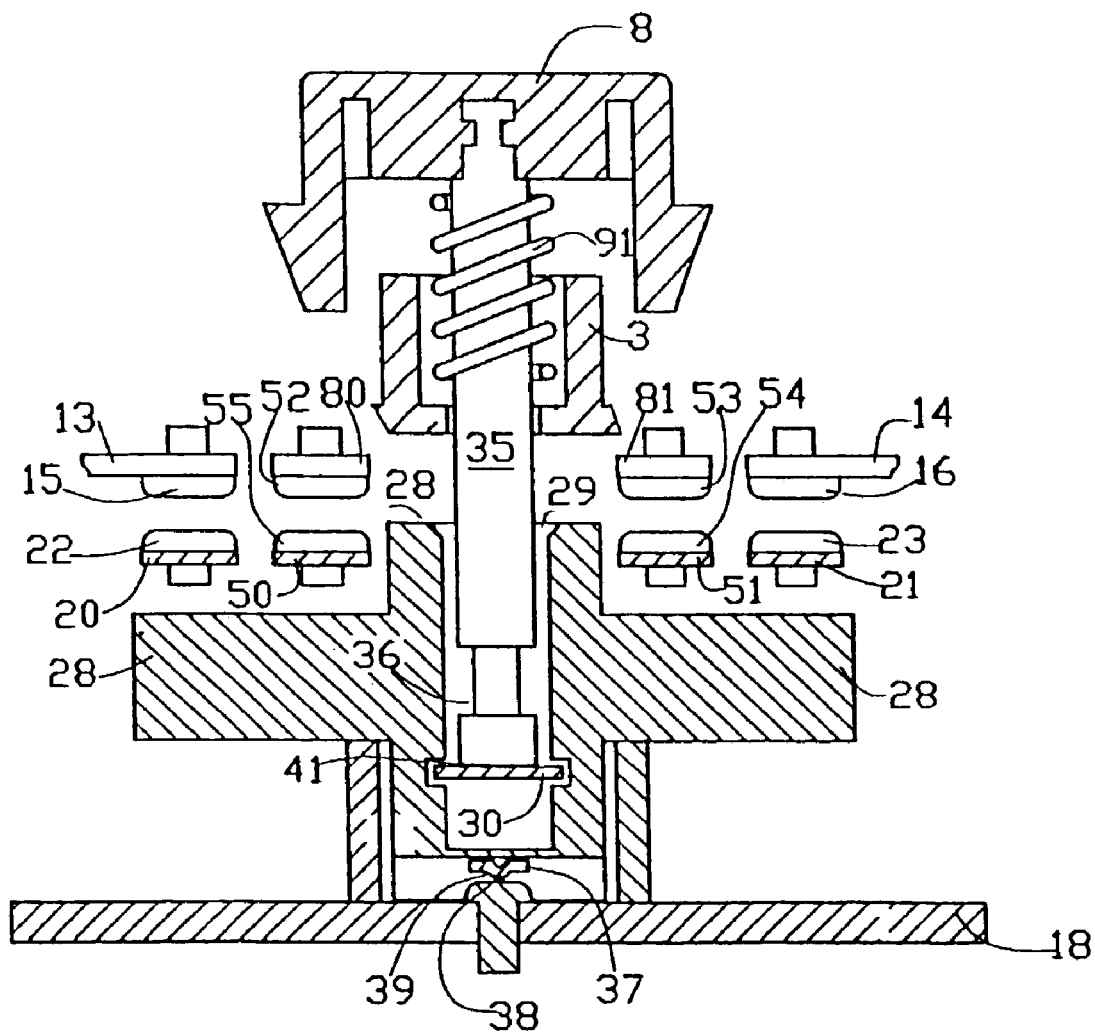

Referring now to FIGS. 5A and 5B, the reset button bias member 28 on the electric circuit board 18 is located underneath the reset button 8. A housing 100 may be provided to support the reset button bias member (See FIG. 1). A portion of the bias member 28 is arranged below the flexible input fingers 20, 21, 50 and 51, as best seen in FIG. 5B. A central opening 29 is provided in the top of the reset button bias member 28, and a movable L-shaped latch 30 is arranged at the bottom of the reset button bias member 28. The latch component 30 includes an opening 31. The latch 30 has a first leg that extends into bias member 28 and through the central opening 29. The latch 30 is preferably movable in a horizontal direction through the bias member 28. A second leg of the latch 30 is disposed along side of the bias member 28. A circular groove 33 is provided between one side of the reset button bias member 28 and the second leg of the latch 30. The circular groove 33 has a spring 34 fit therein. The spring 34 is biased against the second leg of the latch 30. A directional lock 35 is located inside the reset button bias member 28 and vertically passes through the central opening 29. The directional lock 35 has a bottom surface 41. A locking groove 36 is provided on the directional lock 35, near the bottom surface 41. A spring 91 is provided to the top of the directional lock 35, beneath the reset button 8.

Figure 8:
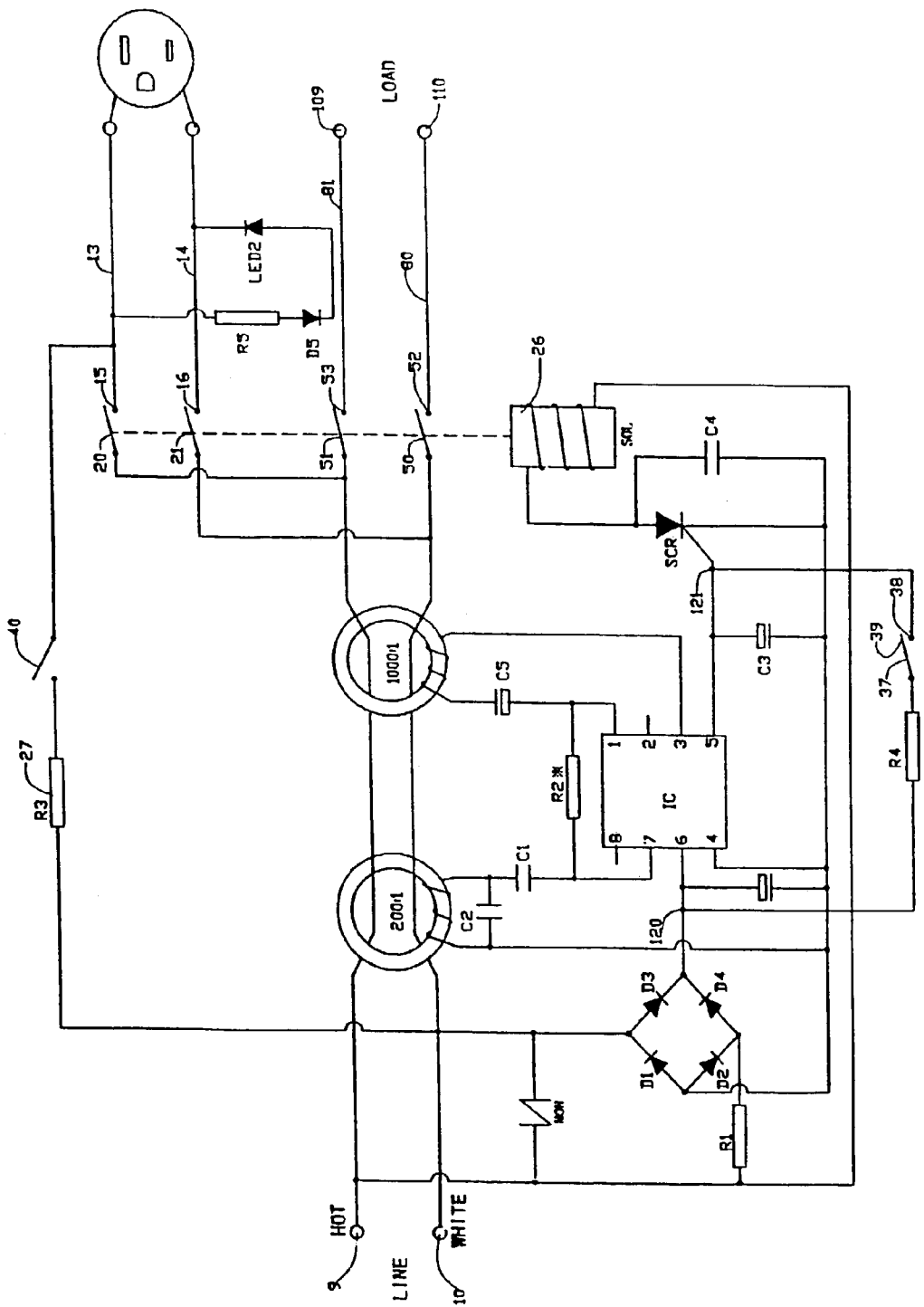
FIG. 8 is a schematic diagram of the electric circuit of the circuit interrupting device of an embodiment of the present invention.

As shown in FIGS. 5A and 8, the flexible switch 37, made of a flexible conductive material, is located between the reset button bias member 28 and the electric circuit board 18. A first end of the flexible switch 37 is connected to the electric circuit board 18. A second end of the flexible switch 37 is moveable and has a protruding pinpoint contact 39 that corresponds to a contact 38 disposed on the circuit board 18 underneath contact 39. The first end of the flexible switch 37 is connected to a rectifier circuit 120, and the second end of the flexible switch is connected to a gate trigger 121 of a SCR (See FIG. 8). The flexible switch 37 and the SCR are used to test for and to guard against reverse wiring, i.e. to prevent an error in connecting the electric input wiring and the electric output wiring of the circuit interrupting device, as is described in more detail below.

FIGS. 5A–6B indicate an example of a scheme under which the circuit interrupting device of an exemplary embodiment of the present invention works to prevent leakage of electric current and to interrupt an electric connection between the input and the output. FIGS. 5A and 5B illustrate an exemplary circuit interrupting device with the circuit interrupted, that is, there in no connection between contacts 15, 16, 52, 53 and contacts 20, 21, 50, 51, respectively. In FIGS. 5A and 5B, the reset button 8 is depressed to reset the circuit interrupting device to a conducting state. When the reset button 8 is depressed, the directional lock 35 moves downward. As can be seen in FIG. 5A, the opening 31 in latch 30 is misaligned, that is, offset, with the bottom surface 41 of the directional lock 35. Thus the bottom surface 41 cannot pass through the opening 31 and is pressed against the surface of the latch 30. The downward action of the directional lock 35 against the latch 30 causes the bias member 28 to move downward. Because of the downward movement of the reset button bias member 28, the pinpoint contact 39 on the flexible switch 37 is moved downward and connected to contact 38 as shown in FIGS. 5A and 5B.

As shown in FIG. 8, the flexible switch 37 is connected at one end to resistor 27, which in turn is connected to an anode 120 of a rectifier circuit. The other end of the flexible switch 37 is connected through the contact 38 to a trigger gate 121 of the SCR. An electric connection between contacts 38 and 39 completes a circuit between gate 121 and anode 120. When the electric input and output wiring is connected to the circuit interrupting device properly, i.e. no reverse wiring, a positive voltage is provided at anode 120. This voltage should bias the SCR into a conducting state, allowing current to flow through the solenoid coil 26. The solenoid coil 26 is thus charged with electricity and yields a magnetic field, which draws the plunger 42 inward to hit on the latch 30. The latch 30 moves with the plunger 42 against the force of spring 34, to the left in FIG. 5A. The movement of latch 30 aligns the opening 31 with the bottom surface 41 of the directional lock 35 such that the bottom surface 41 of the directional lock 35 passes through the opening 31, as shown in FIGS. 6A and 6B.

Figure 6A:
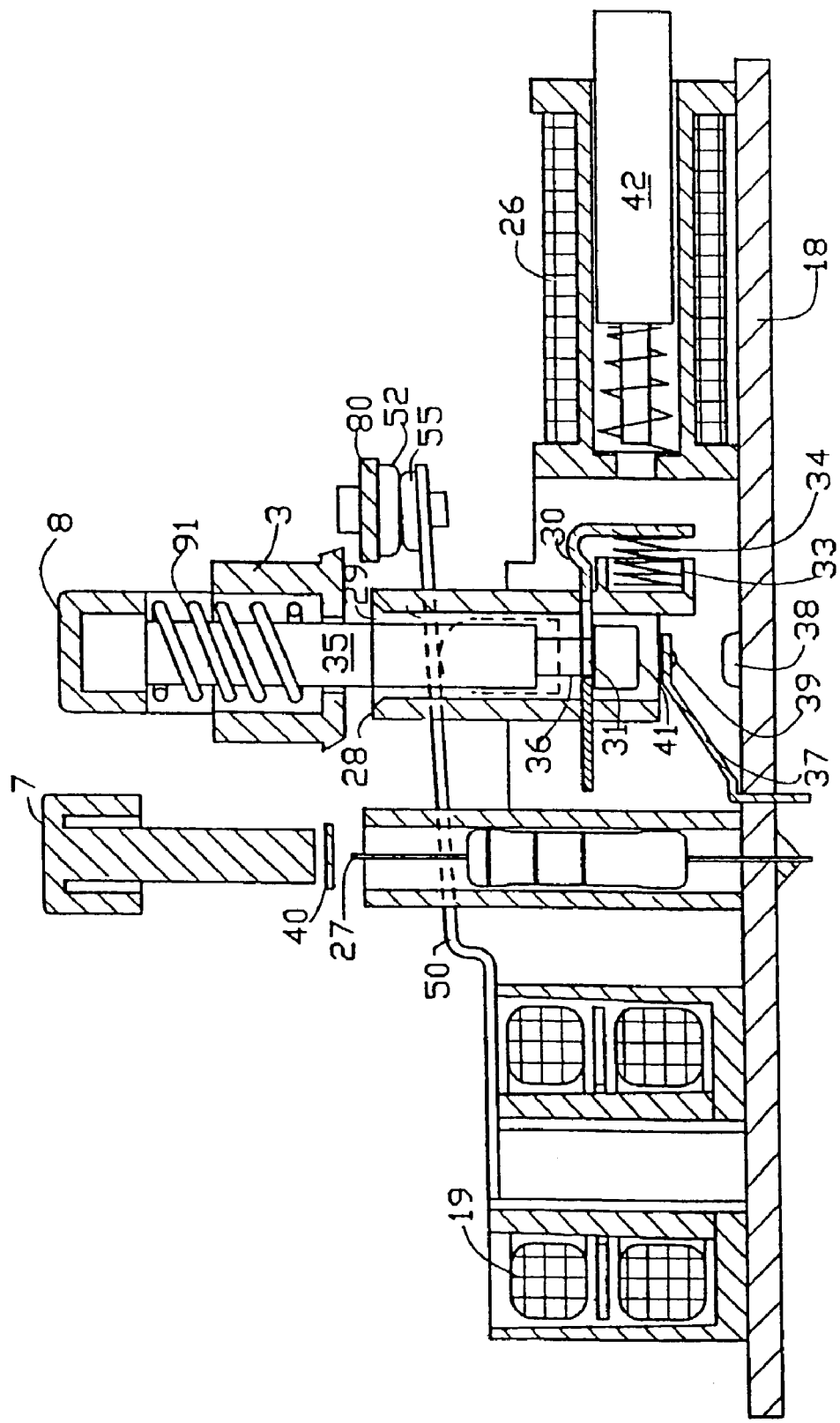
FIG. 6A is a sectional view of FIG. 3 following line A—A, schematically showing the electric connection between the electric input end and the electric output end in the circuit interrupting device of an embodiment of the present invention.
Figure 6B:
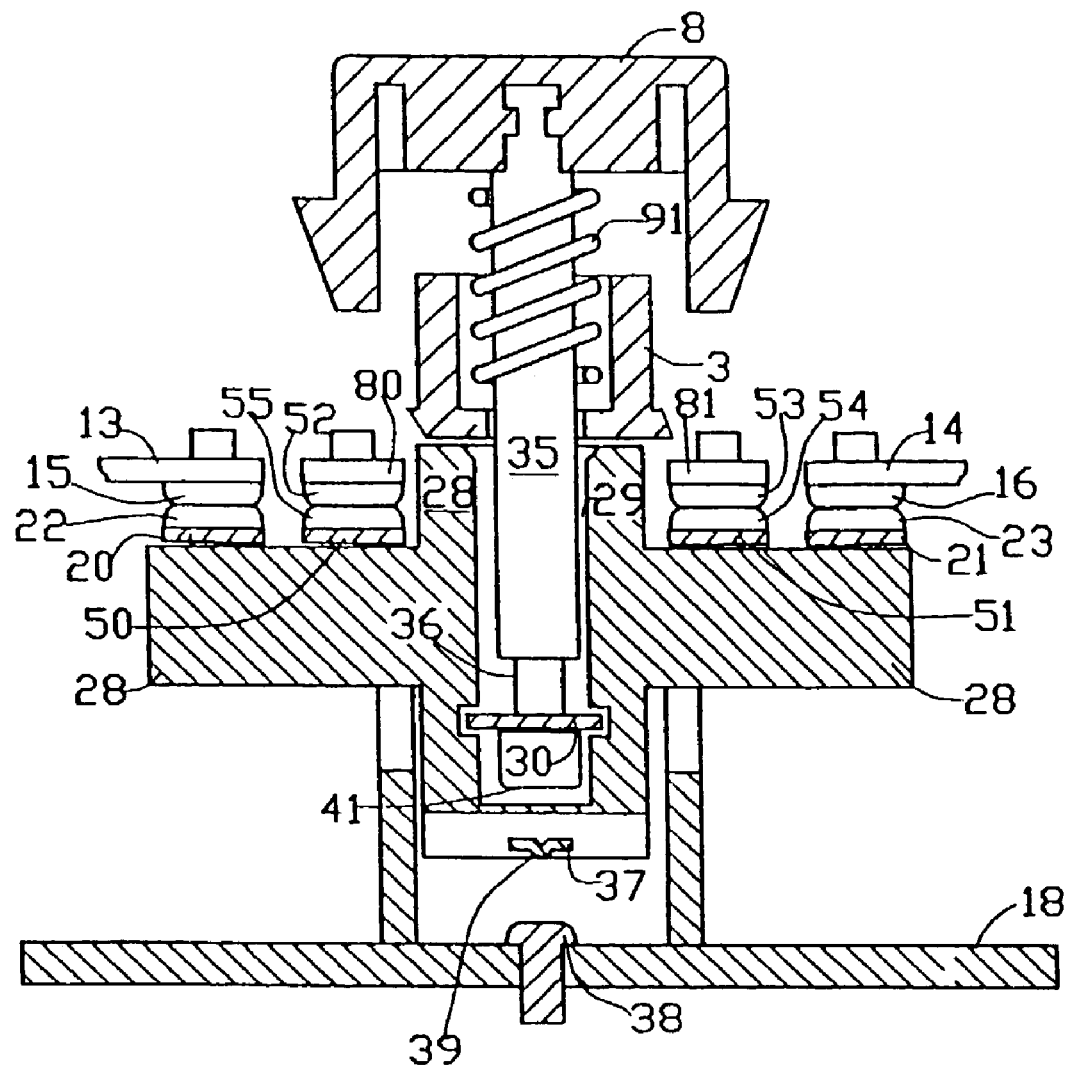
FIG. 6B is a sectional view of FIG. 3 following line B—B, schematically showing the electric connection between the electric input end and the electric output end in the circuit interrupting device of an embodiment of the present invention.

FIGS. 6A and 6B illustrate the state of the circuit interrupting device after the reset button 8 is released. When reset button 8 is released, the pinpoint contact 39 and the contact 38 of the flexible switch 37 are disconnected. A voltage is no longer present at gate 121 and the SCR is no longer biased into a conducting state. Thus, the electric current no longer flows through solenoid coil 26 and the solenoid coil 26 no longer produces the magnetic field. In turn, the plunger 42 no longer acts on the latch 30. The spring 34 between the latch 30 and the reset button bias member 28 causes the latch 30 to move back towards its misaligned position, to the right in FIGS. 5A and 6A. However, since the directional lock 35 is now positioned in opening 31, the latch 30 cannot move completely back to the misaligned position. Instead, the opening 31 of the latch 30 slides into the locking groove 36 of the directional lock 35. Due to the force of spring 34, the directional lock 35 and the latch 30 are engaged with each other as shown in FIG. 6A.

At substantially the same time the connection between contacts 38 and 39 is broken, the release of the reset button 8 allows the spring 91 near the top of the directional lock 35 to move the reset button 8 and the directional lock 35 upward. Due to the engagement of the directional lock 35 with the latch 30, via the locking groove 36 and opening 31 as described above, the reset button bias member 28 also moves upward. The bias member 28, in turn, lifts the contacts 22, 23, 55, and 54 on the flexible input fingers 20, 21, 50, and 51 upward to connect to the contacts 15 and 16 of the output conductors 13, 14 and to the contacts 52 and 53 of the electric output leads 80 and 81, so that the input and output are electrically connected (FIGS. 6A and 6B).

FIGS. 5A, 5B, and 8 also illustrate an exemplary scheme of protection to interrupt the electric connection of the electric input and the electric output on the circuit interrupting device of an exemplary embodiment the present invention when the electric input is mistakenly reverse-wired to the electric output on the circuit interrupting device. When the circuit interrupting device is reverse-wired, the pair of electric input wires are connected to the electric output screws 109, 110 and the electric output wires are connected to the electric input screws 9, 10. As indicated in FIG. 8, although the circuit interrupting device itself is intact, when the reset button 8 is pressed down so that the two contacts 39 and 38 of the flexible switch 37 are connected, due to the reverse wiring, there is no electric voltage at the trigger gate of the SCR. Thus, the SCR is in a non-conducting state so that no electric current can pass through the solenoid coil 26. As a result, the plunger 42 does not move inward into the solenoid 26 and does not hit on the latch component 30. The opening 31 in latch 30 remains misaligned with the bottom surface 41 of the directional lock 35. The directional lock 35 cannot pass through opening 31 and the bottom surface 41 of the directional lock 35 stays pressed against the surface the latch component 30.

Figure 7:
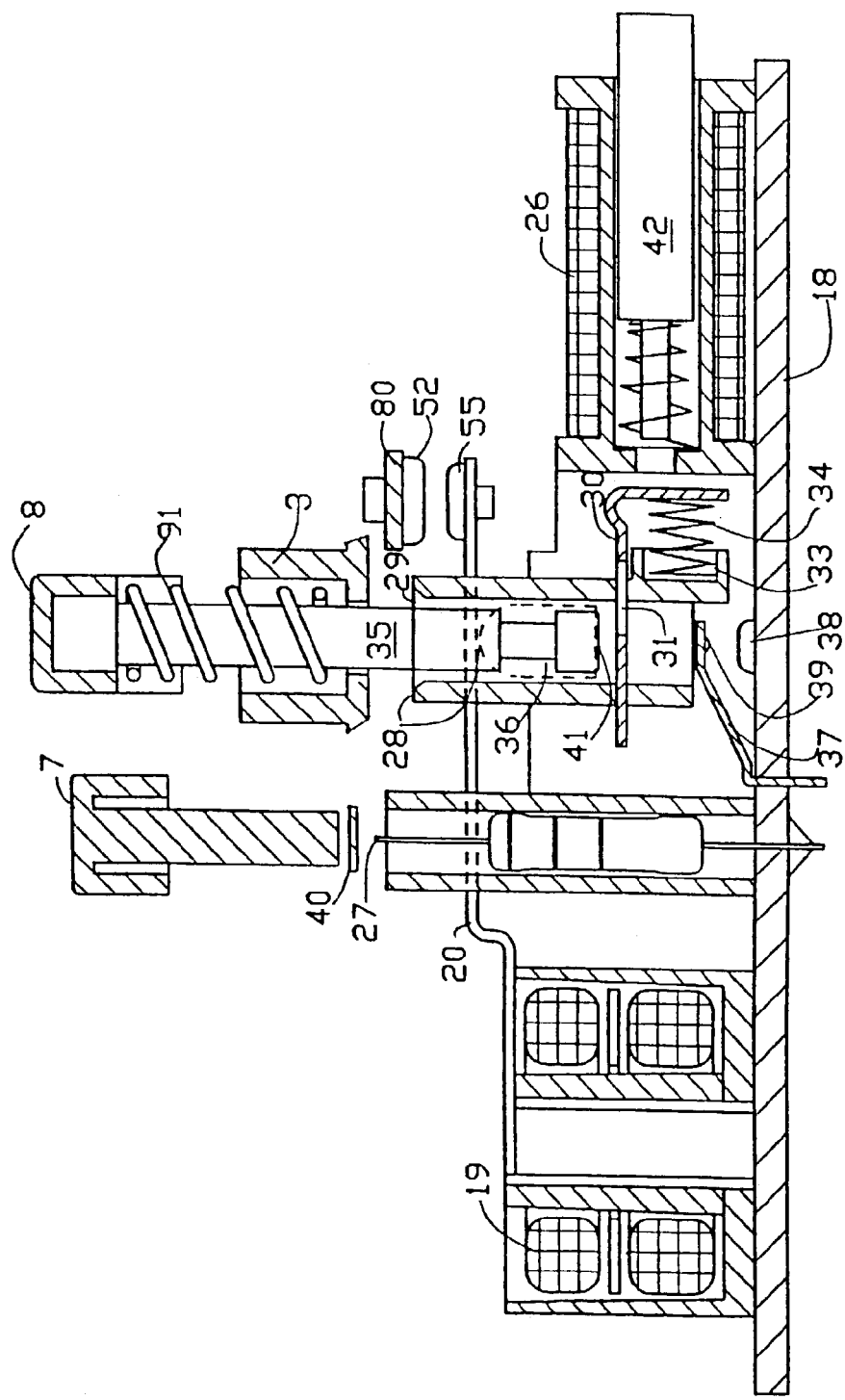
FIG. 7A is a sectional view of FIG. 3 following line A—A, schematically showing the interruption of the electric connection between the electric input end and the electric output end in the circuit interrupting device of an embodiment of the present invention.
FIG. 7B is a sectional view of FIG. 3 following line B—B, schematically showing the interruption of the electric connection between the electric input end and the electric output end in the circuit interrupting device of an embodiment of the present invention.
Figure 7B:
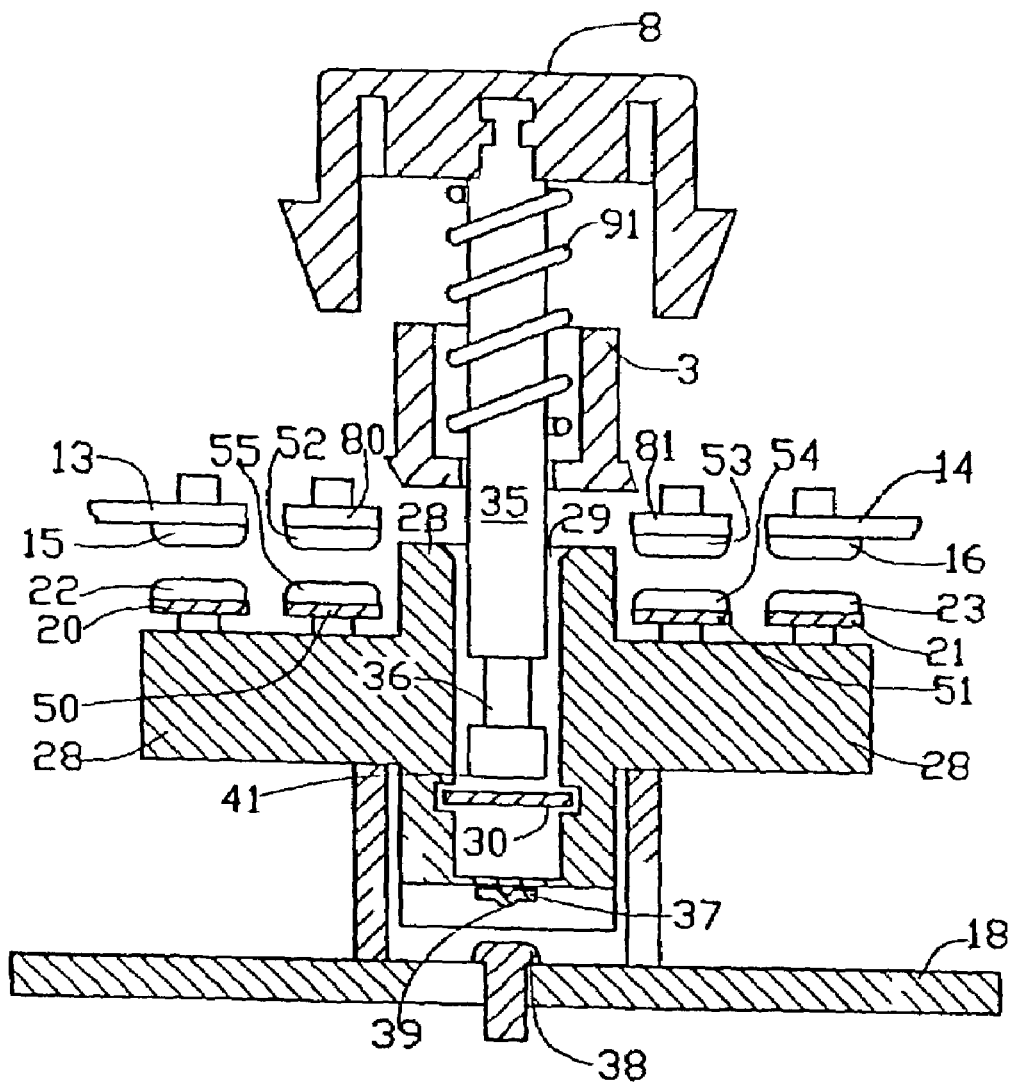

Consequently, when the reset button is released, bias member 28 does not move upward. Therefore, the contacts 22, 23, 55, and 54 of the flexible input fingers 20, 21, 50, and 51 are not connected to the contacts 15 and 16 of the output conductors 13 and 14 and the contacts 52 and 53 of the electric output leads 80 and 81, as is shown in FIGS. 7A and 7B. Consequently, there is no electric connection between the electric input and the electric output.

FIGS. 7A, 7B and 8 also illustrate the state of an exemplary circuit interrupting device when a fault has been detected. Initially, the circuit interrupting device is in the position illustrated in FIGS. 6A and 6B, with the contacts closed. When the differential transformer 19 of the circuit interrupting device of an exemplary embodiment the present invention detects a leakage electric current, a signal is provided to the IC (FIG. 8). The IC generates a signal that biases the SCR into conducting state so that the solenoid coil 26 has electric current flowing therein, which produces a magnetic field. The plunger 42 is drawn into the solenoid coil 26 by the magnetic field and hits on the latch 30, which pushes the latch 30 against the force of spring 34. The latch 30 is thus moved to its aligned position. The locking groove 36 on the directional lock 35 slides out of engagement with the opening 31 of the latch 30. The directional lock 35 is now free to move through opening 31. The reset button 8 moves up due to the force of the spring 91 and pulls the directional lock 35 upwards. The reset button bias member 28 slides downward when pushed by flexible input fingers 20, 21, 50, and 51. In turn, the contacts 22, 23, 55, 54 of the flexible input fingers 20, 21, 50, and 51 separate from the contacts 15 and 16 of the output conductors 13 and 14 and the contacts 52 and 53 of the electric output leads 80 and 81. Thus, the electric connection between the electric input and the electric output is interrupted, as shown in FIGS. 7A and 7B.

When the user wants to disconnect the electric connection between the electric input and the electric output of the circuit interrupting device, the test button 7 is depressed so that the test button switch 40 is connected to the test resistor 27. When the differential transformer 19 detects a test leakage electric current, the SCR becomes conducting. Consequently, the solenoid coil 26 has electric current flowing therein, which produces a magnetic field. The magnetic field draws the plunger 42 inward so that it hits on the latch 30, which pushes the latch 30 against the force of spring 34. The latch 30 is thus moved to the aligned position. The locking groove 36 on the directional lock 35 thus slides out of the opening 31 of the latch component 30, see FIG. 7A. The reset button 8 moves upward because of the force of spring 91 at the top of the directional lock 35 and the reset button bias member 28 moves downward due to the flexible input fingers 20, 21, 50, and 51. As a result, the contacts 22, 23, 55, and 54 on the flexible input fingers 20, 21, 50, and 51 are disconnected from the contacts 15 and 16 of the output conductors 13 and 14 and the contacts 52 and 53 on the electric output leads 80 and 81. Thus, the electric connection between the electric input and the electric output is interrupted.

The above detailed description is illustrative, but not limiting the scope of the present invention. Reasonable variations, such as those occur to reasonable artisan, can be made herein without departing from the scope of the present invention.

We claim:

1. A reset apparatus for a circuit interrupting device including a line side connection capable of being electrically connected to a source of electricity; a load side connection capable of being electrically connected to a load side conductor, the reset apparatus comprising:
   a housing;
   a reset button connected to the housing; the reset button having a depressed and a relaxed position;
   a resilient element biasing the reset button into the relaxed position;
   a directional lock coupled to the reset button and having a bottom surface;
   a bias member arranged under the reset button, the reset bias member defining a central aperture therein receiving the directional lock, the directional lock being moveable in a vertical direction in the aperture;
   a first pair of electric contacts for making an electric connection between the line side connection and the load side connection;
   a latch extending into the bias member and through the aperture, the latch defining an opening therein and being movable through the aperture in a horizontal direction between an aligned position in which the opening is aligned with the bottom surface of the directional lock and a misaligned position in which the opening is misaligned with the bottom surface of the directional lock, wherein the latch is adapted to engage the directional lock such that movement of the reset button to the relaxed state causes the bias member to close the first pair electric contact; and a flexible switch located between the bias member and the housing, wherein said flexible switch has a first end attached to an electric circuit board of the housing and a second end adapted to be in contact with the bias member; the second end of the flexible switch having a first contact point on the flexible switch which corresponds to a second contact point on the electric circuit board of the housing;

wherein the second contact point of the electric circuit board is connected to a silicon-controlled rectifier (SCR), which is in turn connected to a solenoid coil;

whereby when the reset button is depressed, a downward movement of the bias member causes the first contact point of the flexible switch to be in contact with the second contact point of the electric circuit board so as to perform a reverse wiring test.

2. The apparatus of claim 1, wherein the bottom surface of the directional lock is arranged above the latch when the reset button is in its relaxed position.

3. The apparatus of claim 2, wherein when the latch is in the misaligned position and the reset button is moved to its depressed position, the bottom surface of the directional lock engages the latch and moves the latch and the bias member downward, closing the first contact point and the second contact point to perform a reverse wiring test.

4. The apparatus of claim 3, wherein if a reverse wiring condition exists, the latch remains in the misaligned position such that when the reset button returns to its relaxed position, the first pair of contacts remain open.

5. The apparatus of claim 3, wherein if a reverse wiring condition does not exist, the latch moves to the aligned position and the directional lock moves in a vertical direction through the opening.

6. The apparatus of claim 5, wherein as the reset button moves from the depressed position to the relaxed position, the latch engages with the directional lock whereby the directional lock moves the latch and the bias member upward to close the first pair of contacts.

7. The apparatus of claim 1, further comprising a fault sensing circuit responsive to at least one fault, the fault sensing circuit causing the latch to move to the aligned position allowing the bias member to return to the relaxed state thereby interrupting the circuit.

8. The apparatus of claim 1, wherein the latch comprises an L-shaped member, a first leg of the L-shape member extending into the bias member and a second leg being disposed along an exterior of the bias member.

9. The apparatus of claim 8, further comprising a biasing element disposed between the second leg and the exterior of the bias member and biasing the latch into the misaligned position.

10. The apparatus of claim 9, wherein biasing element is a spring.

11. The apparatus of claim 8, further comprising: a plunger disposed in the solenoid, the plunger moving between a first position when the solenoid is energized and a second position when the solenoid is de-energized, the plunger engaging the latch in the first position to move the latch in the horizontal direction against the force of the biasing element into the aligned position such that the directional lock can pass through the opening.

12. The apparatus of claim 1, wherein the directional lock is cylindrical shaped and the resilient member comprises a spring disposed around the directional lock between the reset button the bias member.

13. The apparatus of claim 12, wherein the directional lock further comprises a groove, the opening in the latch engaging the groove to hold the latch and the directional groove in a fixed relationship.

14. The apparatus of claim 12, further comprising a housing supporting the bias member.

15. The apparatus of claim 1, wherein the flexible switch is made of flexible metal material.

16. A circuit interrupting device, comprising:

a first conductor;

a second conductor;

a first pair of contacts, each contact coupled to one of the first and second conductors;

a reset button;

a second pair of contacts moveable to a closed position via the reset button;

a solenoid;

a plunger disposed in the solenoid, the plunger being moveable between a first position and second position when the solenoid is energized and de-energized, respectively;

a flexible switch coupled to the solenoid and to at least one of the first and second conductors via the second pair of contacts, the flexible switch preventing current flow through the solenoid to de-energize the solenoid when the first and second conductors are reverse wired and allowing current flow to energize the solenoid when the first and second conductors are wired correctly; and a fault detection circuit that energizes the solenoid when a fault is detected, wherein when the solenoid is energized via the current controller, the plunger initiates closing of the first pair of contacts to complete a circuit between the first and second conductors and when the solenoid is energized via the fault detection circuit the plunger initiates opening of the first pair of contacts to interrupt the circuit between the first and second conductors.

17. The apparatus according to claim 1, wherein the electric circuit board is connected to a resistor.

* * * * *